United States Patent [19]

Johnson

[11] Patent Number: 5,195,385
[45] Date of Patent: Mar. 23, 1993

[54] FREE RANGING BI-DIRECTIONAL HYDRAULIC DUMPING MECHANISM

[75] Inventor: Jerome A. Johnson, 1509 W. 2nd Ave., Gary, Ind. 46402

[73] Assignee: Jerome A. Johnson, Gary, Ind.

[21] Appl. No.: 783,181

[22] Filed: Oct. 28, 1991

[51] Int. Cl.$^5$ .............................................. B60P 1/16
[52] U.S. Cl. .................................. 74/105; 298/19 B; 298/22 B
[58] Field of Search ................. 298/19 B, 22 B, 22 D, 298/22 J; 254/3 R, 8 R, 93 VA; 74/105

[56] References Cited

U.S. PATENT DOCUMENTS 2,581,662  1/1952  Hutchinson ...................... 298/19 B Primary Examiner—Michael S. Huppert
Assistant Examiner—Janice Krizek

[57] ABSTRACT

A mechanism for transmitting force produced by a cylinder includes fulcra (5) and linkages (22) pivotally connected at one of their ends to the fulcra (5). The linkages (22) are pivotally connected at the other of their ends to an anchor block (15). The cylinder is pivotally mounted on the anchor block (15). The anchor block (15) moves on rollers (22) along tram guides (11) during the work stroke of the cylinder. The tram guides (11) have slots through which pivotal connecting means (18) extend. The pivotal connecting means (18) are connected to the one end of the linkages (22).

1 Claim, 3 Drawing Sheets

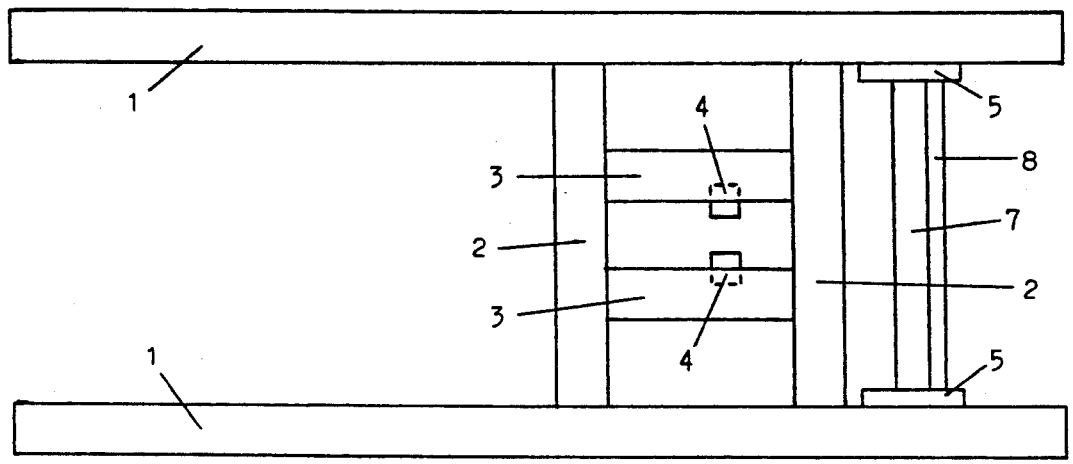
FIG. 1
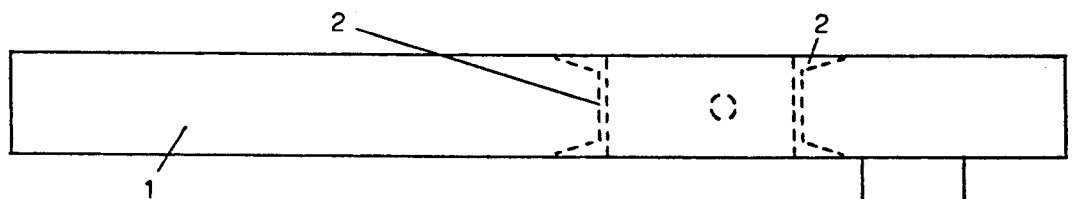
FIG. 2
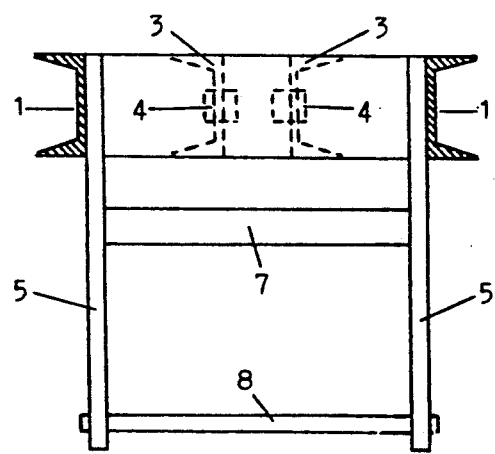
FIG. 3
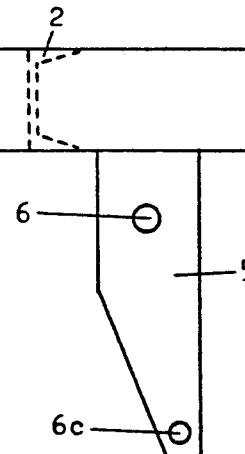

FREE RANGING BI-DIRECTIONAL HYDRAULIC DUMPING MECHANISM

TECHNICAL FIELD

This invention relates to new and useful improvements in the art of dump trucks and other cylinder actuated equipment; seeking to advance the art through the application of optimum workforce.

BACKGROUND ART

In conventional applications of the art, a working cylinder is anchored (inertly fixed) at one end to a given frame. The desired work is achieved from the opposite end, when working force (cylinder extension under pounds per square inch pressure) often in conjunction with linkage is applied to a load. In this application, potential workforce equivalent to pounds per square inch actual workforce is lost to this system on the anchored end.

SUMMARY

The objective of this invention is to introduce a concept for maximizing the workforce usage applied to the art through a recovery process which employs a simplicity of construction and no inert anchorage.

DRAWINGS

FIG. 1 is a plan view of a bed section of the mechanism.

FIG. 2 is a longitudinal side view of the bed section.

FIG. 3 is an end view.

BEST MODE FOR CARRYING OUT THE INVENTION

Figure 4:
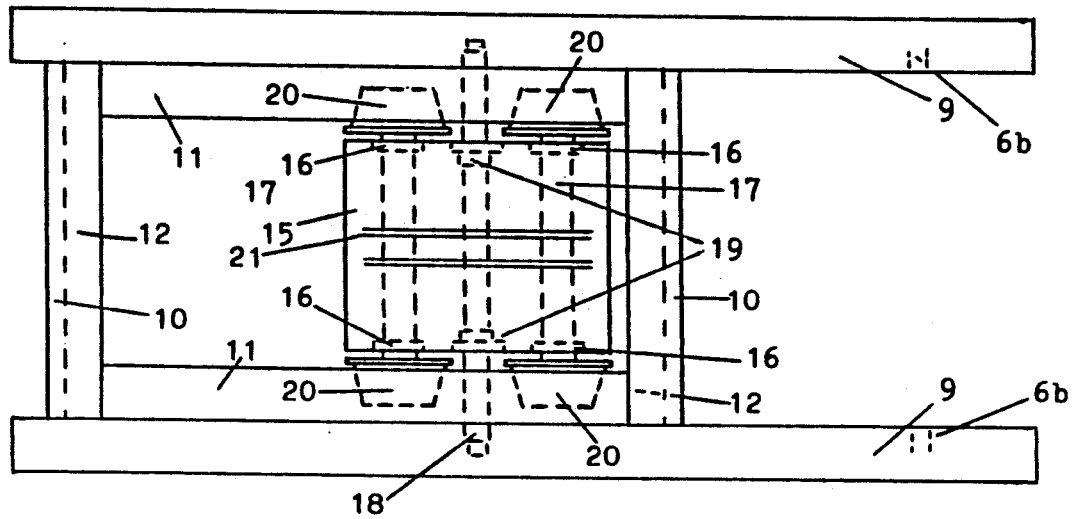
FIG. 4 is a plan view of the chassis section of the mechanism with the tram installed.

Proceeding now to describe my invention in detail, it will be seen upon referring to the accompanying drawings that the invention basically comprises a two piece framework joined by a pivot at one end, two fulcra, two bi-end pivoting linkages, a rolling (mobile) anchor and an actuator means to complete the circuit. FIGS. 1-3 collectively depict the bed section of the mechanism. Longitudinal side beam members (1) are comprised of structural channel, with the flanges thereof facing outwardly, to which a suitable cargo box may be fixed. Spanning the width between side beam members (1) and fixedly attached thereto with fastening means (rivets being preferred), are two crossmembers (2). The crossmembers (2), being fixedly attached at the median and near the pivoting end of the side beams, retain the side beam members (1) in longitudinal parallel relation to an existing or new vehicle framework. Parallel to the side beam members (1) and spanning the distance between said crossmembers (2) are two upper cylinder mount brackets (3). The mount brackets (3), comprised of channels, are positioned with the flanges thereof facing outwardly. The brackets (3) are bored through the centers of the webs thereof and rearwardly along their lengths and are positioned sufficiently apart to receive two transversely mounted bushing sleeves (4) and a cylinder rod eye in close tolerance. The sleeves (4), being comprised of seamless tube, are positioned through the bores of the brackets (3) and are welded on all sides.

Fixedly attached to the webs of the side beam members (1), at a designated point of the frame pivot and extending downwardly are two fulcra (5). the fulcra (5), being constructed of pressed sheet steel, are bored in the centers (6) thereof congruently in pivotal relation to the chassis section of the mechanism at (6b). Spanning the distance between fulcra (5), at the bored center (6), is the main pivot rod housing (7). The main pivot rod housing (7), being comprised of seamless tube and fixed by welds, serves to retain fulcra (5) and side beam members (9) in close pivotal tolerance. The fulcra (5) are bored at the lower ends thereof at (6c) and equipped with a lower fulcra pivot rod housing (8). The lower pivot rod housing (8), being constructed of smaller tube, but constructed similarly as member (7), is dimensioned to transverse the fulcra (5) marginally. The lower pivot rod housing (8) is fixed by welds on all sides and serves as a connector between linkage (22) and fulcra (5).

Figure 5:
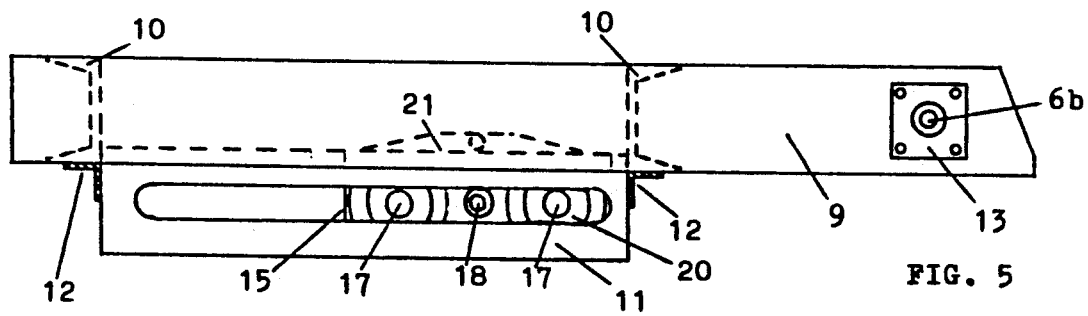
FIG. 5 is a longitudinal side view with the tram detailed
Figure 6:
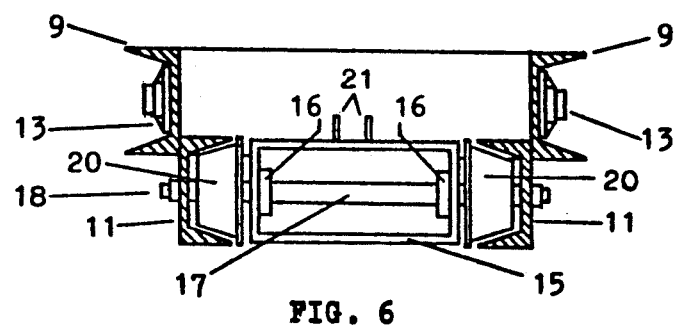
FIG. 6 is a rear end view of the chassis section, crossmember removed; tram visible.
Figure 7:
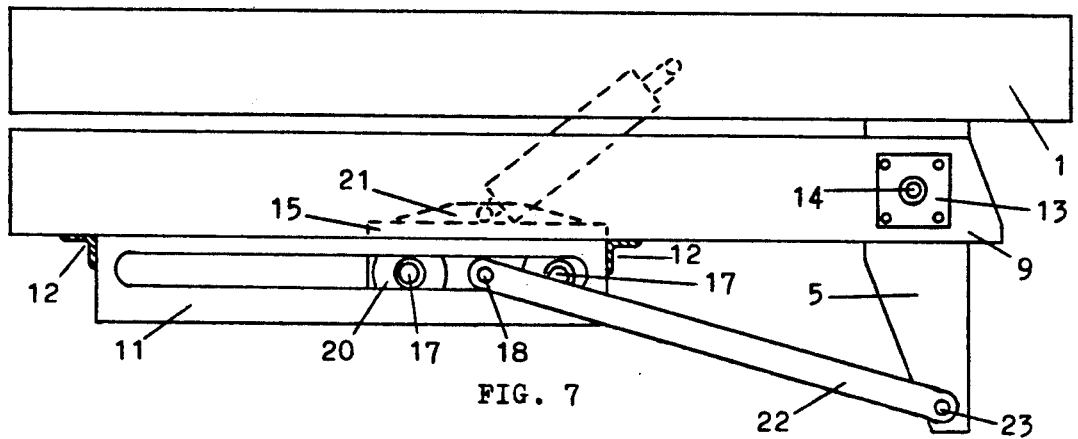
FIG. 7 is a perspective of the mechanism complete.
Figure 8:
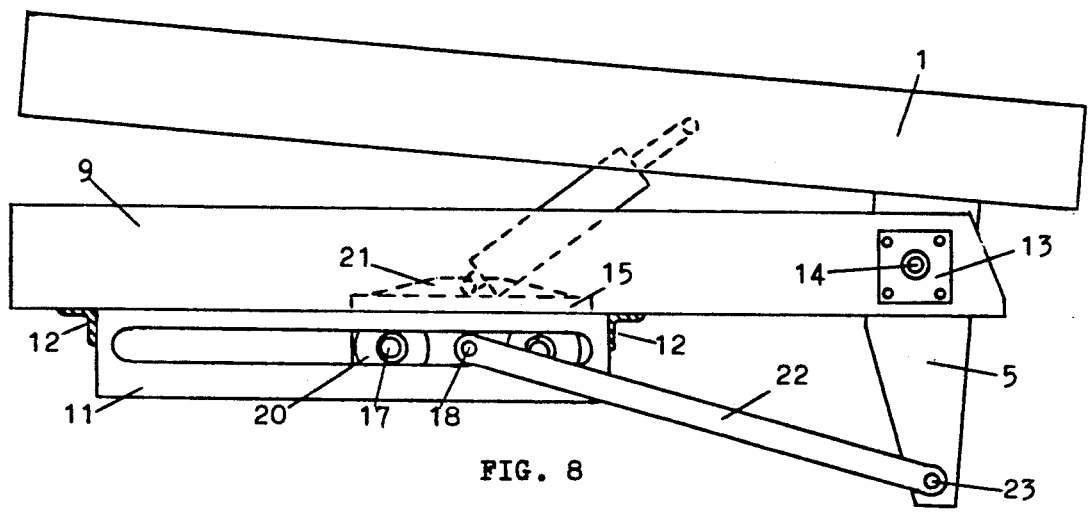
FIG. 8 is a perspective of the mechanism activated.
Figure 9:
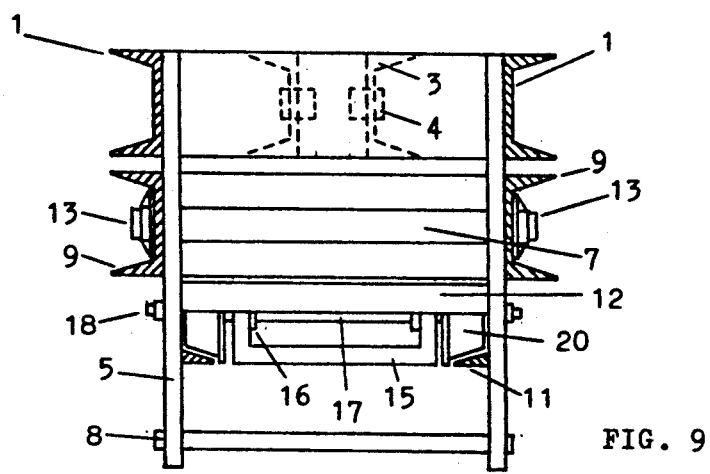
FIG. 9 is a rear end view of the mechanism; with the linkage removed.

The chassis section of the mechanism, depicted in FIGS. 4-6, is comprised of two longitudinal side beams (9). The side beams (9) are comprised of channels with the flanges thereof facing outwardly similarly as side beam members (1) but somewhat shorter in length and tapered at the rear thereof behind the pivot bore. The taper of the side beams (9) is to allow clearance of the bed section of the mechanism during the work stroke of the cylinder. The width between side beams (9) is spanned at the front and rearwardly of the middle thereof with crossmembers (10). The crossmembers (10), comprised of channels with the flanges thereof facing forwardly and rearwardly, serve to hold side beams (9) in parallel relationship to side beam members (1). Spanning the distance between crossmembers (10) longitudinally and recessed within the side beams (9) are fixed two tram guides (11). The tram guides (11) are comprised of channels with the flanges thereof facing inwardly. The tram guides (11) are dimensioned so as to encase tram wheels (20) and have horizontal slots in the webs thereof which allow the tram/linkage pivot rod (18) to reciprocate a complete cycle therein. The tram guides (11) are stiffened against splay, with a suitable strutting material (12) (a 90° angle shown), measured to span the width of the tram guides (11) at each end. Mounted at the bores (6b) of the side beams (9), between the flanges thereof, are fixed two sleeved flange bearings (13). The flange bearings (13) are equipped with set screws to retain the main pivot rod (14) in relative position.

A tram anchor block (15) is comprised of a section of rectangular tube having a height and width corresponding to the thickness of and the space between the tram guides (11) (but nominally less in width). The vertical portions of the anchor block (15) are bored congruently on both sides in the middle thereof in three places. Fixed to the outer bores, but on the inside of the anchor block (15) are four guide sleeves (16). The guide sleeves (16) are fitted with set screws to retain members (17) in relative fixed position. The members (17) are comprised of rods stepped in diameter on the ends thereof so as to create a shoulder stop for rollers (20). The rollers (20) are encased in bearings and pressed to fit. The tram/- linkage pivot rod (18) is of greater length than members (17) and mounted with two sleeved flange bearings (19) to insure fluidity of rotation and with set screws for retaining positioning. Stepped in diameter on the ends thereof, the tram/linkage pivot rod (18) traverses the tram guides (11) to the extent of shoulder alignment with the extended portion of the lower pivot rod housing (8). Fixedly attached to the top of the anchor block (15) in the center thereof are two steel plates (21). The steel plates (21) are bored and spaced sufficiently apart to receive a lower cylinder eye and retaining pin.

The linkages (22) are forged and bored at the ends thereof which ends are press fitted with suitable pivot bushings. The linkages (22) are positioned to link the tram/linkage pivot (18) to the fulcra (5) at lower pivot rod housing (8) with rod (23) and are retained with clips.

As many changes could be made in carrying out the foregoing constructions without departing from the scope of the invention, it is intended that all matter contained in the foregoing description or shown in the accompanying drawings shall be interpreted as illustrative and not in a limiting sense.

I claim:

1. A mechanism for transmitting force produced by a cylinder means having a cylinder end and a cylinder rod end, said mechanism comprising:

first beam members (1);
means (4) for pivotally connecting said cylinder rod end of said cylinder means to said first beam members (1);
fulcra (5) mounted to said first beam members (1);
second beam members (9);
tram guides (11) mounted to said second beam members (9), said tram guides (11) having formed therein slots;
an anchor block (15);
members (20) mounted on said anchor block (15) and engageable with said tram guides (11) to facilitate movement of said anchor block (15) along said tram guides (11);
cylinder attachment means (21) mounted on said anchor block (15) for attaching said cylinder end of said cylinder means to said anchor block (15);
means (14) for pivotally connecting said fulcra (5) to said second beam members (9);
linkages (22) having first and second ends;
pivotal connecting means (18) mounted to said anchor block (15) and movable within said slot of said tram guides (11), said first ends of said linkages (22) being pivotally connected to said pivotal connecting means (18); and
means (23) for pivotally connecting said second ends of said linkages (22) to said fulcra (5).

* * * * *